United States Patent [19]

Fowler

[11] Patent Number: 4,921,713

[45] Date of Patent: May 1, 1990

[54] VERSATILE CONTROLLED FLAVOR STRAW ASSEMBLY

[76] Inventor: Daniel L. Fowler, Hospital Dr. North #23, Ordfino, Id. 83544

[21] Appl. No.: 58,386

[22] Filed: Jun. 5, 1987

[51] Int. Cl.$^5$ ............................................. A23L 2/00
[52] U.S. Cl. ....................................... 426/85; 426/96
[58] Field of Search ..................... 426/85, 96; 424/468

[56] References Cited

U.S. PATENT DOCUMENTS 2,102,920  12/1937  Savage ................................. 426/85
3,463,361  8/1969  Cook et al. ........................... 426/85

FOREIGN PATENT DOCUMENTS 217467   5/1958   Australia ............................... 426/85
90189   12/1960   Denmark .............................. 426/85
1143410  2/1963   Fed. Rep. of Germany ........ 426/85

Primary Examiner—Peter Chin

[57] ABSTRACT

A straw assembly for imparting flavor to otherwise neutral liquids such as milk or water includes a first section of straw for immersion in the neutral liquid and a second section of straw for placing in the user's mouth. Intermediate the two sections of straw is a chamber, which may be an intermediate section of the straw, for containing flavor imparting material, with the surface area of the flavor imparting material having an area greater than the chamber within which it is enclosed. The flavor imparting material may take the form of (1) a hollow cylinder mounted within the straw and spaced from the walls thereof, and (2) a separate enlarged chamber containing the flavor material, and (3) granular material held within the body of the straw by a pair of sponges or other porous material; (4) a re-entrant flavor imparting liner having a large surface area in view of its irregular inner surface, or (5) a plurality of different flavored materials which are successively introduced into the neutral liquid through the use of time delay coatings on granular flavor imparting material.

9 Claims, 2 Drawing Sheets

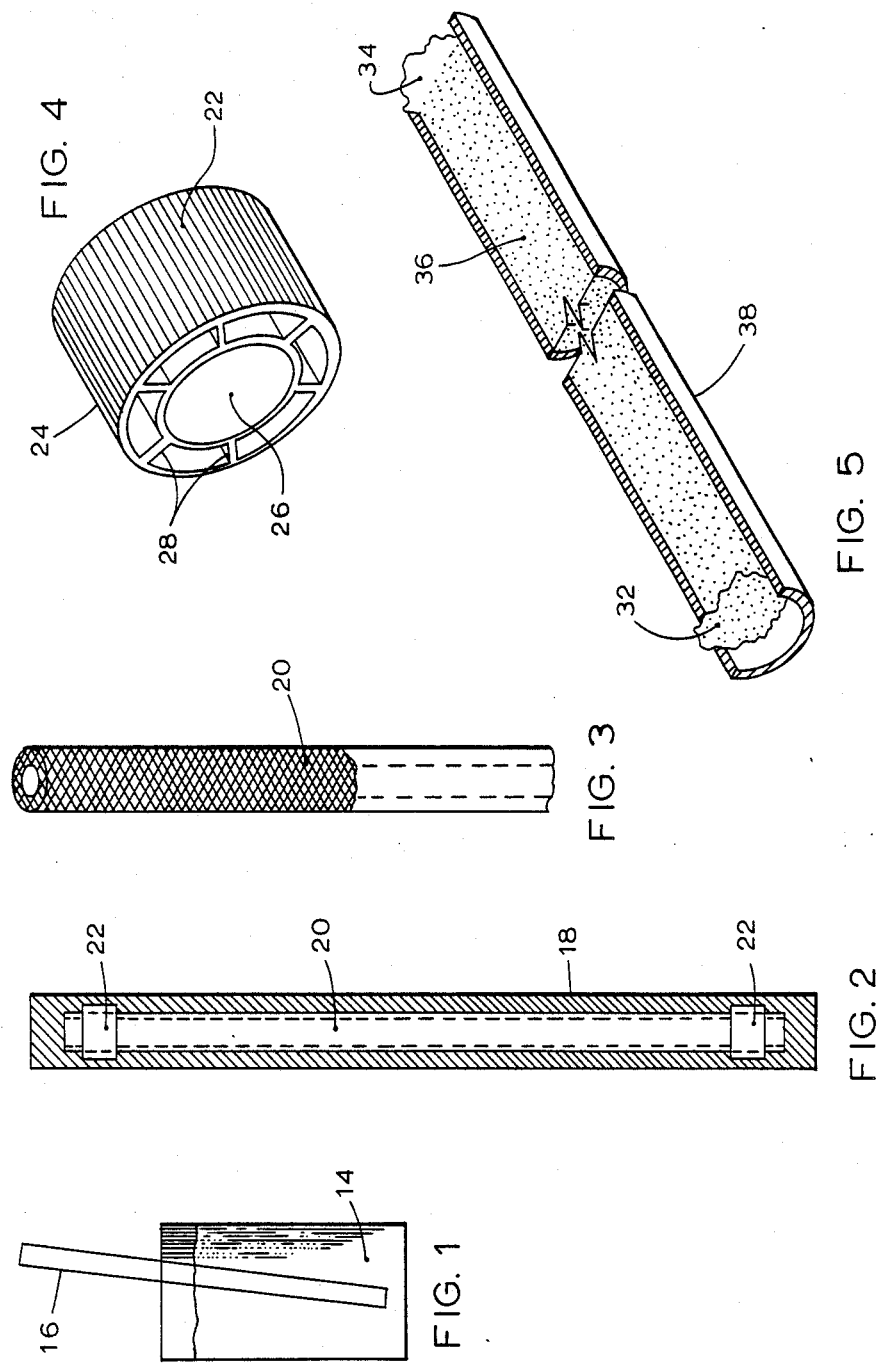

4,921,713

VERSATILE CONTROLLED FLAVOR STRAW ASSEMBLY

FIELD OF THE INVENTION

This invention relates to straw assemblies which contain a flavoring material.

BACKGROUND OF THE INVENTION

It has previously been proposed to use a liner of flavored material on the inner surface of a straw, and typical prior art patents disclosing such arrangements include the following:

U.S. Pat. Nos. 4,610,870
4,547,359
4,447,254
4,434,152
3,148,124

However, these prior art arrangements frequently provided such a weak flavoring to the neutral liquid as to hardly noticeable, and may change the concentration of flavor imparted to the liquid as the flavor material is used up, and lack versatility.

Accordingly, a principal object of the invention is to overcome the foregoing difficulties, deficiencies and problems inherent in prior art flavor straw proposals.

SUMMARY OF THE INVENTION

In accordance with the present invention, a versatile flavor straw assembly includes a first section of straw for immersion in a neutral liquid such as milk and water and a second section of straw for the user to draw on by inserting into the user's mouth. Intermediate between the two sections of the straw is a chamber, which may be the side walls of a continuous straw, wherein flavor imparting material is mounted, and the flavor imparting material is configured to have an area exposed to the neutral fluid which is greater than that of the chamber within which it is enclosed.

In accordance with particular arrangements for implementing the foregoing straw assembly, the following arrangements may be employed:

The flavor imparting material may take the form of (1) a hollow cylinder mounted within the straw and spaced from the walls thereof, and (2) a separate enlarged chamber containing the flavor material, and (3) granular material held within the body of the straw by a pair of sponges or other porous material; (4) a re-entrant flavor imparting liner having a large surface area in view of its irregular inner surface, or (5) a plurality of differently flavored materials which are successfully introduced into the neutral liquid through the use of time delay coatings on the granular flavor imparting material. Further, the straw itself may be edible.

Other objects, features and advantages of the invention will become apparent from a consideration of the following detailed description and from the accompanying drawings.

BRIEF DESCRIPTION OF THE DRAWINGS

FIG. 1 is a side view of a flavor straw assembly with one end of the straw assembly being immersed in a neutral liquid and the other end of the straw being exposed for the user;

FIG. 2 is a cross sectional side view of a flavor straw assembly illustrating the principles of the present invention;

FIG. 3 is a detailed showing of the flavor imparting material in the assembly of FIG. 2;

FIG. 4 is a perspective view of the mounting arrangements for holding the flavor element of FIG. 3 within the assembly of FIG. 2;

FIG. 5 is a cross sectional side view of a flavor straw assembly wherein granulated flavored material is held within the straw assembly by two porous members or sponges;

DETAILED DESCRIPTION

Figure 6:
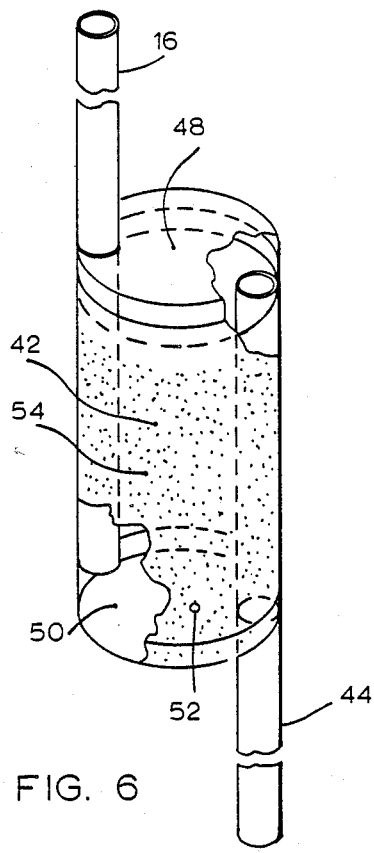
FIG. 6 is a side view of an alternative straw assembly wherein the central section holding the granular particulate flavored material has a substantially larger cross section than the straw sections.

Referring more particularly to the drawings, FIG. 1 is a diagramatic showing of a glass 12, filled with a neutral fluid 14 which may, for example, be water or milk.

Reference numeral 16 refers to a flavor straw assembly of any of several types, to be described in greater detail herein below. It may be noted in passing that the flavor straw 16, in all of its various embodiments herein below, has a significantly greater surface area of the flavor imparting material than the area of the wall of the straw, or the chamber, in which the flavored material is enclosed.

FIG. 2 shows a straw 18, which may be of a slightly larger diameter than a conventional straw, having a flavor imparting member 20 centered within the straw 18, with the flavor element 20 being in the configuration of a hollow cylinder, as best shown in FIG. 3. The hollow cylindrical member 20 may be held centrally within the straw 18 by any suitable technique, but with the members 22, as shown in greater detail in FIG. 4 serving this function. Alternatively, small cylindrical sponges which are hollow and which just fill the space between the element 20 and the straw 18 could be employed for mounting purposes. The flavor element 20, as shown in FIG. 3, may be a solid hollow cylinder, or may be formed of granular material held within a stiff mesh or perforated cylinder, as shown in greater detail in FIG. 3.

In the case where granular material is employed, the inner and outer walls of the hollow cylinder 20 may be formed of sheet material similar to a straw, but with thousands of small perforations, slightly smaller in diameter than the granular material contained therein.

As mentioned above, the elements 22, which hold the cylindrical material in place, may be formed, as shown in FIG. 4, with an outer cylindrical portion 24, which engages the inner surface of the straw, and an inner cylindrical portion 26, which holds the flavor member 20. Ribs 28 intercouple the outer and inner cylinders 24 and 26.

FIG. 5 shows an alternative embodiment of the flavor straw in which the two sponges 32 and 34 maintain the granular flavor producing material 36 within the body of the straw 38, and held between the two sponges. While the granular material may take any desired form, in sample tests the breakfast drink in the granular form, sold under the brand name of "TANG," has been successfully used. The sponge-like material was of the very open cell variety, with apertures slightly smaller than the initial smaller granular sizes of the TANG particles. The sponge material is almost gauze-like in its consistency, to permit the free flow of liquid through it, while still holding the flavor material within the straw. When a straw approximately 7 or 8 inches long and 3/6 inch in diameter was employed, and the neutral fluid was water, a good strong orange flavor resulting from the dissolved TANG material was present throughout the entire consumption of a small glass of water, measured from an eight ounce cup. The sponges 32 may be held in position in any desired manner by non-soluble adhesive material, or by a fiber extending through the straw and the sponge.

FIG. 6 shows an alternative embodiment of the invention in which an enlarged chamber 42 serves to interconnect the input section 44 of the straw, and the output section 46 of the straw. The input straw section 44 extends within the chamber 42 and stops well short of the upper closure 48 at the top of the chamber 42. Similarly, the output straw 46 extends down within the chamber 42 and close to the bottom 50 thereof but spaced from it, to suck out all of the liquid drawn into the chamber 42. The chamber 42 may be filled with one or two types of granular flavored material 52 and 54 by using two types of flavor material. First one type of flavor may predominate and flavor the liquid being drawn through the assembly, and subsequently the other flavor may take over and provide the controlling flavor. By way of assembly, the one type of flavoring material 52 could be uncoated and provide the initial flavoring for the fluid being drawn through the straw assembly; and the second type of flavoring material 54 may be coated with a delayed release surface coating, so that after exposure to liquid for approximately 30 seconds (the time for dissolving of the first flavor 52), then the second flavor 54 will be exposed to the liquid and will dissolve into it.

Figure 7:
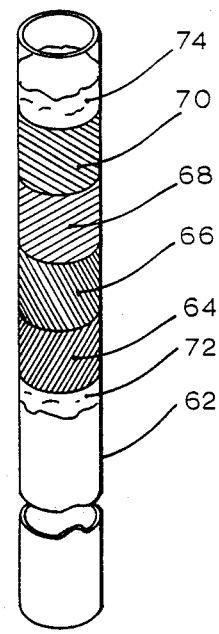
FIG. 7 is a cross sectional view of an embodiment of the invention wherein a plurality of different flavor imparting materials are employed with timed delay release arrangements and sequentially flavoring the liquid with the different flavors.

Referring now to FIG. 7 of the drawings, the straw 62 includes a plurality of different flavoring materials 64, 66, 68 and 70, held in position by the open cell sponge elements 72 and 74, which are similar in function to the sponges 32 and 34 of FIG. 5. With reference to FIG. 7, the different flavors will have timed releases for successive use. Thus, one of the flavors 64 may be uncoated, while flavor 66 may have a 20 or 30-second time delay; flavor material 68 may be coated to provide a 40 to 60-second time delay; and flavor 70 may have a 60 to 90-second time delay, so that as liquid is continuously being drawn through the straw 62, the user will first taste one flavor and then, insuccessive intervals of time, additional flavors will be tasted.

Incidentally, the techniques for the delayed release of substances are well developed, particularly in the pharmaceutical field, and suitable ingredients for providing timed release are well known in the art, see U.S. Pat. Nos. 4,610,870; 4,547,359; 4,447,254; 4,434,152; and 3,148,124, for examples.

Figure 8:
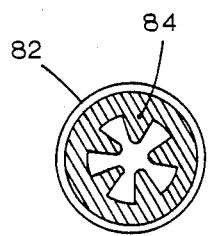
FIG. 8 is a cross sectional view of an alternate embodiment of the invention in which the inner flavor rod has a re-entrant configuration to increase the surface area exposed to the liquid.
Figure 9:
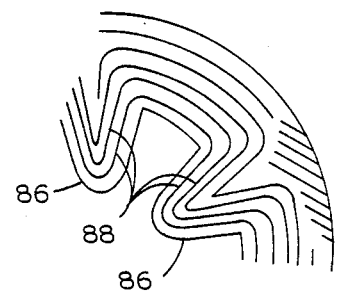
FIG. 9 is an enlarged cross sectional view of a portion of the flavor element of FIG. 8.

FIG. 8 shows another embodiment of the flavor straw assembly in which a straw 82 contains a solid flavor imparting member 84, which has a re-entrant configuration. More specifically, the inner configuration of the flavor member 84 may be as shown in FIG. 9, wherein protrusions 86 extend inward the center of the straw, and lines 88 indicate the successive configurations of the inner portion of the flavor element as it is being dissolved.

It may be seen from the successive lines 89 that the amount of flavor being imparted to the neutral liquid being drawn through the flavor straw remains substantially constant during the process.

Concerning another matter, the outer straw members in each case may be formed of edible material, as desired, with flavored, hardened gelatin type material being preferred. Other edible materials which will maintain a straw-like configuration during initial usage may be employed.

In conclusion, it is to be understood that certain illustrative embodiments of the invention have been shown in the drawings and described hereinabove. However, other arrangements may be employed to implement the present invention. By way of example, and not of limitation, the flavor material used in each case may be commercially available, such as TANG, as mentioned hereinabove, KOOLAID granules, or any other known type of flavoring material. In addition, other arrangements for providing increased surface areas of the flavor material, so that its surface area is greater than that of the straw or other enclosing chamber, could be employed. Accordingly, the present invention is not limited to those embodiments precisely as shown hereinabove and described in detail.

What is claimed is:

1. A straw assembly for imparting flavor to an otherwise neutral liquid such as milk or water, comprising:
    a first section of straw for immersion in the neutral liquid;
    a second section of straw for the user to draw on;
    means intercoupling said sections of straw for supplying flavor to the neutral liquid passing through the two sections of straw;
    said means including a chamber having side walls, and flavor imparting material located within said chamber, with the surface area of the flavor imparting material being greater than that of the chamber within which it is enclosed, whereby a relatively high concentration of flavor is applied to the neutral liquid;
    said flavor imparting material including at least two distinctly different flavors; and
    coating means on at least one of said flavors imparting materials for delaying the dissolving of one of said flavors until the other flavor is substantially dissolved.

2. A straw assembly as defined in claim 1, wherein two liquid permeable porous retention means are mounted in spaced relationship within the straw, and wherein said flavor imparting material is granular in form and is mounted between the two porous retention means.

3. A straw assembly as defined in claim 2, wherein said porous retention means are small sponges.

4. A straw assembly as defined in claim 1, wherein said flavor imparting material is in the form of granules, and timed release coating means are provided for delaying the exposure of some of said flavor imparting material to said fluid by blocking the fluid from said material by said timed release coating means.

5. A straw assembly as defined in claim 1, including at least three different flavor imparting materials included in said straw assembly, and time delay release means for successively releasing flavors from said differently flavored material.

6. A straw assembly for imparting flavor to an otherwise neutral liquid, such as milk or water, comprising:
a first section of straw for immersion in the neutral liquid;
a second section of straw for the user to draw on;
means intercoupling said sections of straw for supplying flavor to the neutral liquid passing through the two sections of straw;
said means including a chamber having side walls, and flavor imparting material located within said chamber, with the surface area of the flavor imparting material being greater than that of the chamber within which it is enclosed; and
two liquid permeable porous retention means mounted in spaced relationship within the straw, and said flavor imparting material being granular in form and being mounted between the two porous retention means;
whereby a relatively high concentration of flavor is applied to the neutral liquid.

7. A straw assembly as defined in claim 6, wherein said porous retention means are small sponges.

8. A straw assembly as defined in claim 6, wherein said flavor imparting material is in the form of granules, and timed release coating means are provided for delaying the exposure of some of said flavor imparting material to said fluid by blocking the fluid from said material by said timed release means.

9. A straw assembly for imparting flavor to an otherwise neutral liquid, such as milk or water, comprising:
a first section of straw for immersion in the neutral liquid;
a second section of straw for the user to draw on;
means intercoupling said sections of straw for supplying flavor to the neutral liquid passing through the two sections of straw;
said means including a chamber having side walls, and flavor imparting material located within said chamber, with the surface area of the flavor imparting material being greater than that of the chamber within which it is enclosed, whereby a relatively high concentration of flavor is applied to the natural liquid;
said flavor imparting material being granular and including at least three distinct flavors;
time delay release means for successively delaying the dissolving of all except one of said flavors until the preceding flavor is substantially dissolved; and
two liquid permeable, porous retention means mounted in spaced relationship within the straw, and said flavor imparting material being mounted between the two porous retention means.

* * * * *